US009906617B2

(12) United States Patent
Pack et al.

(10) Patent No.: US 9,906,617 B2
(45) Date of Patent: Feb. 27, 2018

(54) METHOD AND APPARATUS FOR SENDING INFORMATION USING SHARING CACHE BETWEEN PORTABLE TERMINALS

(71) Applicants: Samsung Electronics Co., Ltd., Gyeonggi-do (KR); Korea University Research and Business Foundation, Seoul (KR)

(72) Inventors: Sang-Heon Pack, Seoul (KR); Gwang-Woo Park, Gyeonggi-do (KR); Young-Jun Shim, Seoul (KR); Chung-Gu Kang, Seoul (KR)

(73) Assignees: Samsung Electronics Co., Ltd., Suwon-si, Gyeonggi-do (KR); Korea University Research and Business Foundation, Seoul (KR)

(*) Notice: Subject to any disclaimer, the term of this patent is extended or adjusted under 35 U.S.C. 154(b) by 200 days.

(21) Appl. No.: 14/229,741

(22) Filed: Mar. 28, 2014

(65) Prior Publication Data

US 2014/0297779 A1 Oct. 2, 2014

(30) Foreign Application Priority Data

Mar. 28, 2013 (KR) ........................ 10-2013-0033881

(51) Int. Cl.
*G06F 15/167* (2006.01)
*H04L 29/08* (2006.01)

(52) U.S. Cl.
CPC ........ *H04L 67/2842* (2013.01); *H04L 67/288* (2013.01); *H04L 67/289* (2013.01); *H04L 67/2857* (2013.01)

(58) Field of Classification Search
CPC ............. H04L 67/2842; H04L 67/2857; H04L 67/288
See application file for complete search history.

(56) References Cited

U.S. PATENT DOCUMENTS 8,548,012 B2 * 10/2013 Guo ...................... H04L 1/0041
370/229
2009/0187673 A1 * 7/2009 Ramjee ............... H04L 67/2876
709/247
(Continued)

FOREIGN PATENT DOCUMENTS

KR 10-0781218 11/2007
KR 10-2008-0087997 10/2008
KR 10-2012-0108307 10/2012

OTHER PUBLICATIONS

Neil T. Spring, et al., "A Protocol-Independent Technique for Eliminating Redundant Network Traffic", Computer Science and Engineering, University of Washington, Seattle, Washington, Aug. 28, 2000, 9 pages.

*Primary Examiner* — Nam Tran

(57) ABSTRACT

A method for operating a receiving portable terminal in a mobile communication system includes receiving a first packet from a sending portable terminal, determining a fingerprint overlapping a fingerprint corresponding to at least one chunk of the first packet in a fingerprint set cache, determining a fingerprint set including the most redundant fingerprints, in the fingerprint set cache, determining at least one fingerprint to send, in the determined fingerprint set, sending the at least one determined fingerprint to the sending portable terminal, and receiving a second packet from the sending portable terminal. An apparatus includes a controller configured to determine at least one redundant fingerprint overlapping a fingerprint corresponding to at least one chunk of the first packet in a fingerprint set cache, determine a fingerprint set including the most redundant fingerprint in the fingerprint set cache, and determine at least one fingerprint to send in the determined fingerprint set.

16 Claims, 13 Drawing Sheets

(56) References Cited

U.S. PATENT DOCUMENTS

2013/0326156 A1\* 12/2013 Cui ................... H04L 67/2842
  711/144
2014/0258370 A1\* 9/2014 Bares ................ H04L 67/2842
  709/203

\* cited by examiner

TERMINAL
(100)

FINGERPRINT STORAGE

| FINGERPRINTS | CHUNKS |
|---|---|
|  |  |
|  |  |
|  |  |

~110

METHOD AND APPARATUS FOR SENDING INFORMATION USING SHARING CACHE BETWEEN PORTABLE TERMINALS

CROSS-REFERENCE TO RELATED APPLICATION AND CLAIM OF PRIORITY

The present application is related to and claims the benefit under 35 U.S.C. § 119(a) to a Korean patent application No. 10-2013-0033881 filed in the Korean Intellectual Property Office on Mar. 28, 2013, the entire disclosure of which is hereby incorporated by reference.

TECHNICAL FIELD

The present disclosure relates generally to a method and an apparatus for sending information by sharing a cache between portable terminals.

BACKGROUND

A web cache is widely used to reduce network traffic between network devices. The web cache primarily receives contents from a catch server, rather than a content server, using a cache server which stores contents between the content server and a portable terminal. Herein, an Internet service provider can install the cache server in an intra network and thus lessen external Internet traffic.

However, since a general web cache service classifies the contents using Uniform Resource Location (URL) information of Hypertext Transfer Transport Protocol (HTTP), it is difficult to apply it to various application layer protocols. As the same contents often have different URLs in the Internet, the web cache is effective only within the network.

In a mobile communication system for wireless communication, transmission/reception errors of packets transmitted and received by the portable terminal greatly increase compared to wired communication. Due to a plurality of portable terminals residing in vicinity, it is hard to share the cache information with all of the portable terminals and the continuous communication is infeasible because of the mobility of the portable terminals.

As a result, the portable terminals cannot share their cache. In this regard, a method and an apparatus for efficiently sharing the cache between the portable terminals are demanded.

SUMMARY

To address the above-discussed deficiencies, it is a primary aspect of the present disclosure to provide a method and an apparatus for sending information by sharing a cache between portable terminals.

Another aspect of the present disclosure is to provide a method and an apparatus for efficiently sending information without having to send and receive redundant information in a portable terminal.

Yet another aspect of the present disclosure is to provide a method and an apparatus of a receiving portable terminal for examining a received packet, when the received packet includes a previously received chunk, selecting chunks expected to be received next in its cache, and sending fingerprints of the selected chunks to a sending portable terminal.

Still another aspect of the present disclosure is to provide a method and an apparatus of a sending portable terminal for efficiently sending information by replacing a chunk replaceable with a received fingerprint, with the fingerprint in a next packet to send.

According to one aspect of the present disclosure, a method for operating a receiving portable terminal in a mobile communication system includes receiving a first packet from a sending portable terminal, determining at least one redundant fingerprint overlapping a fingerprint of at least one chunk of the first packet, in a fingerprint set cache, determining a fingerprint set including the most redundant fingerprint, in the fingerprint set cache, determining at least one fingerprint to send in the fingerprint set, sending the at least one fingerprint to the sending portable terminal and receiving a second packet from the sending portable terminal.

According to another aspect of the present disclosure, an apparatus of a receiving portable terminal in a mobile communication system includes a communication part configured to communicate with a sending portable terminal, a controller configured to receive a first packet from the sending portable terminal through the communication part, determine at least one redundant fingerprint overlapping a fingerprint corresponding to at least one chunk of the first packet in a fingerprint set cache, determine a fingerprint set including the most redundant fingerprint in the fingerprint set cache, determine at least one fingerprint to send in the determined fingerprint set, send the at least one determined fingerprint to the sending portable terminal through the communication part, and receive a second packet from the sending portable terminal through the communication part, and a storage configured to store the fingerprint set and the fingerprint set cache.

According to yet another aspect of the present disclosure, a method for operating a sending portable terminal in a mobile communication system includes sending a first packet to a receiving portable terminal, receiving at least one fingerprint from the receiving portable terminal, encoding a second packet to send to the receiving portable terminal, with the at least one fingerprint, and sending the encoded second packet to the receiving portable terminal.

According to still another aspect of the present disclosure, an apparatus of a sending portable terminal in a mobile communication system includes a communication part for communicating with a receiving portable terminal, and a controller configured to send a first packet to the receiving portable terminal through the communication part, receive at least one fingerprint from the receiving portable terminal, encode a second packet to send to the receiving portable terminal, with the at least one fingerprint, and send the encoded second packet to the receiving portable terminal through the communication part.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
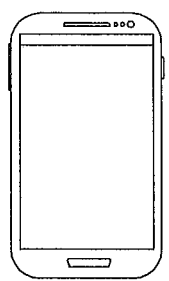
FIG. 1 illustrates relations between fingerprints and chunks according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The following description with reference to the accompanying drawings is provided to assist in a comprehensive understanding of embodiments of the disclosure as defined by the claims and their equivalents. It includes various specific details to assist in that understanding but these are to be regarded as merely example. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure provide a method and an apparatus for sending information by sharing a cache between portable terminals.

When all of the portable terminals of a mobile communication system cannot share their cache, the present disclosure can reduce network traffic for efficient information transmission by gradually sharing their cache information.

In the mobile communication system, the portable terminal can exchange information with a neighboring portable terminal with or without an infrastructure such as base station. The present portable terminal can exchange the information between the neighboring portable terminals by modifying a basic deduplication method.

The present deduplication method addresses the shortcomings of the aforementioned web cache and lessens the redundant traffic in the network. The present deduplication, which primarily targets packets of a network layer which is a third layer, can be applied independently of a higher protocol.

Unlike the web cache, the present deduplication method can designate a single packet to a byte stream and eliminate the previously transmitted part in the packet.

FIG. 1 depicts relations of fingerprints and chunks according to an embodiment of the present disclosure.

Referring to FIG. 1, in the present deduplication method, a portable terminal 100 for sending a packet divides a data payload of the corresponding packet into at least one chunk which is a fixed window size unit, calculates a hash value of the chunks, generates a fingerprint corresponding to the chunk based on the hash value, and stores the fingerprint to a fingerprint storage 110.

When the generated fingerprint is already stored in the fingerprint storage 110, the sending portable terminal 100 assumes that the corresponding chunk is cached in a receiving portable terminal and accordingly sends the packet by replacing the chunk with the fingerprint.

The fingerprint storage 110 includes the chunks and the fingerprint indicative of the corresponding chunks. Input and output of the fingerprint storage 110 is used to process packets of the network layer and thus requires a high speed.

For doing so, the fingerprint storage 110 retains a small capacity and can be stored in a memory. When the chunk pre-stored in the fingerprint storage 110 includes the packet to send, the data sending portable terminal can replace the corresponding chunk with the fingerprint. The receiving portable terminal can restore the fingerprint of the packet to the original chunk using its fingerprint storage 110. The fingerprint storage can be managed based on a Least Recently Used (LRU) algorithm, a Least Frequently Used (LFU) algorithm, and so on.

Figure 2:
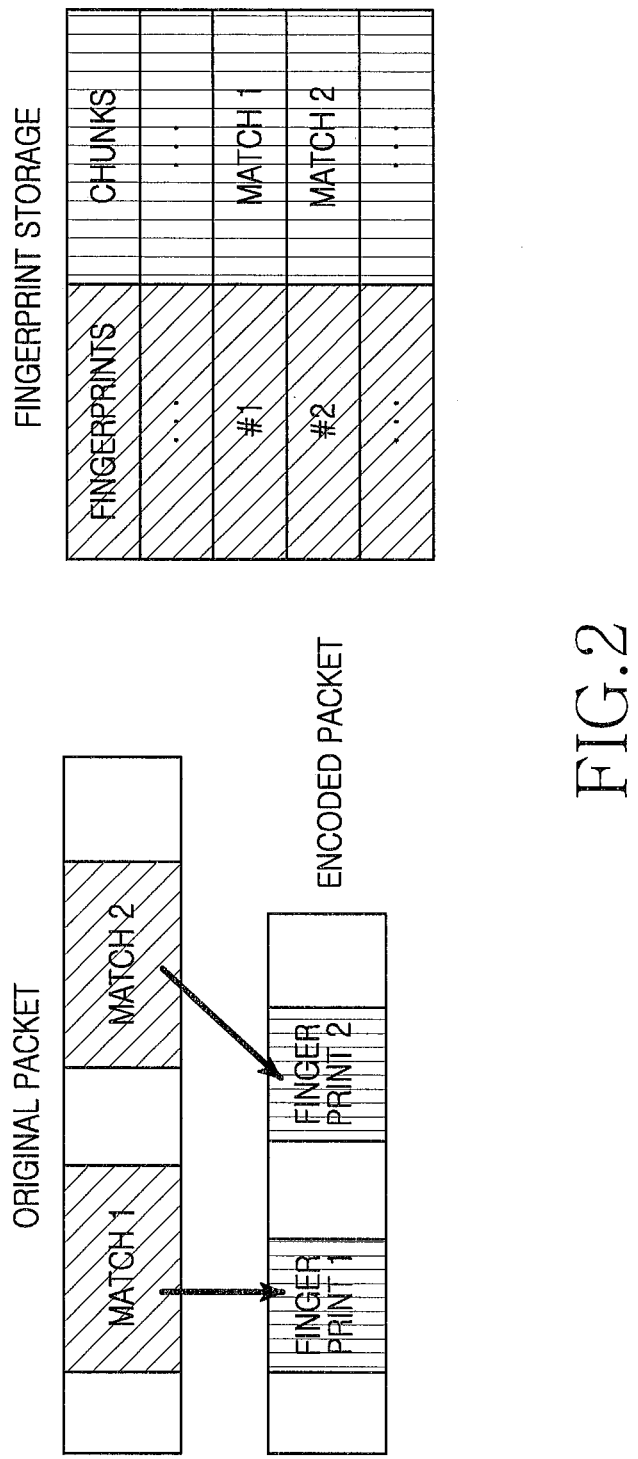
FIG. 2 illustrates relations between the fingerprints and the chunks according to an embodiment of the present disclosure.

FIG. 2 depicts relations of the fingerprints and the chunks according to an embodiment of the present disclosure.

Referring to FIG. 2, when chunks of the original packet to send and chunks of the fingerprint storage include the matching chunks, the portable terminal replaces the matching chunks with the corresponding fingerprints and sends the replaced packet to the receiving portable terminal. Herein, the process for reducing the packet size through the replacement is referred to as encoding.

Upon receiving the packet including the fingerprint, the receiving portable terminal restores the received packet by fetching the corresponding fingerprint from its fingerprint storage and replacing the fetched fingerprint with the corresponding chunk. The process for restoring the packet is referred to as decoding.

The present deduplication method determines whether the actual packet chunk is redundant. Accordingly, even when the same chunk has a different name or Uniform Resource Location (URL), the actual chunk is still the same and the present deduplication method can achieve the cache effect. Since the present deduplication method is applicable independently of the protocol, it does not need a particular application. With any application, the present deduplication method can transparently provide the cache effect to a user.

Figure 3:
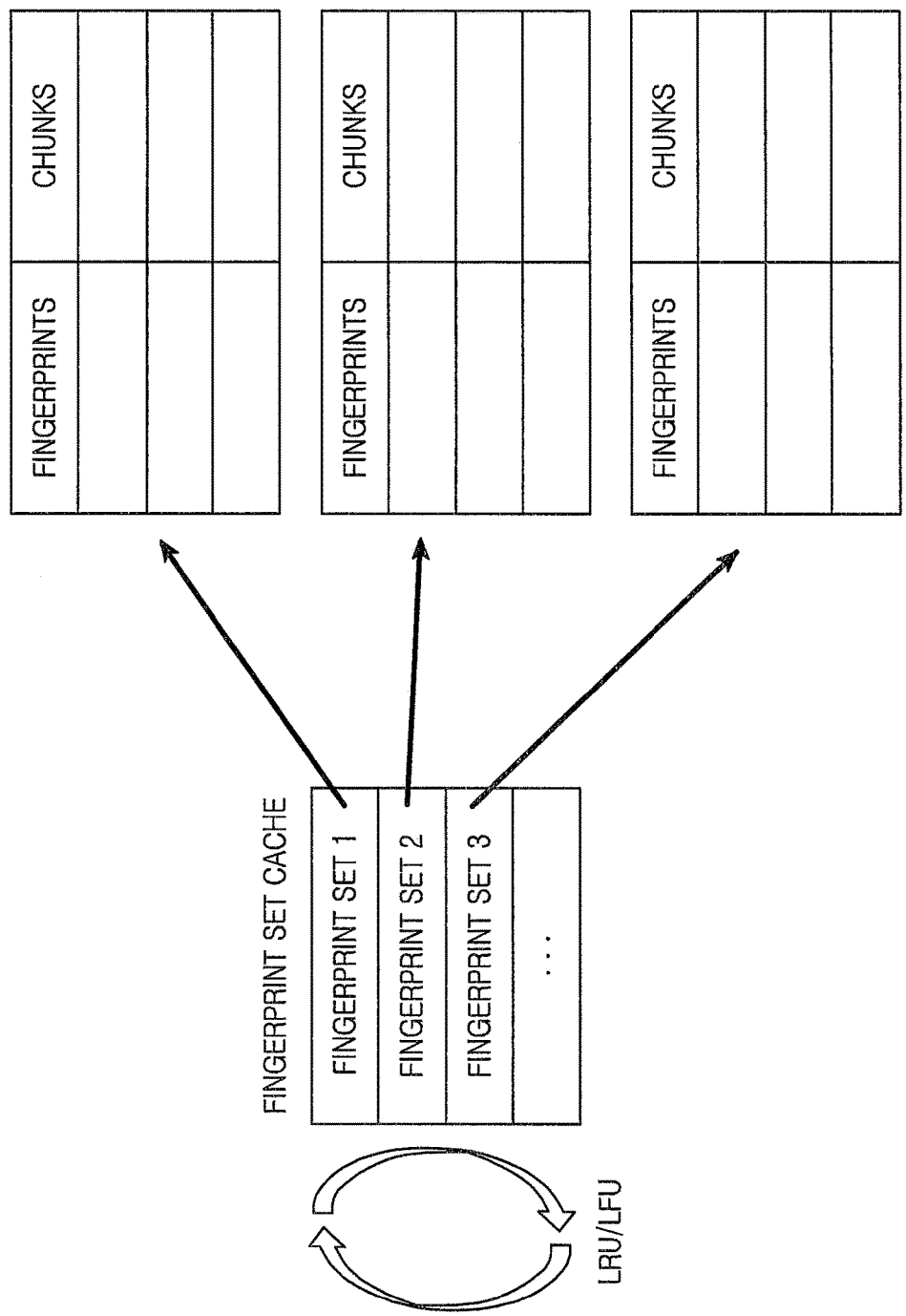
FIG. 3 illustrates a fingerprint set cache according to an embodiment of the present disclosure.

FIG. 3 depicts a fingerprint set cache according to an embodiment of the present disclosure.

Referring to FIG. 3, a fingerprint set includes chunks and fingerprints of the corresponding chunks, similar to the fingerprint storage. The fingerprint set stores the chunks received at the portable terminal on a time basis, and its size can be fixed or variable.

When a file is transmitted, the file is divided into a plurality of packets and sent in the time order. The present deduplication method is performed per packet of the network layer. In the packets of the network layer, it is difficult to distinguish different files. Hence, it is necessary to generate the time-based fingerprint set for the packet and to ensure correlation between the fingerprints as much as possible.

Upon receiving a new packet, the portable terminal generates the fingerprints of the chunks of the packet and retrieves the fingerprint set including the fingerprint matching the corresponding fingerprint from the fingerprint set cache. Next, the portable terminal sends to the sending portable terminal, the fingerprints of the chunks expected to be received next in the corresponding fingerprint set. Herein, the group of the fingerprint sets is referred to as a fingerprint set cache. The fingerprint sets in the fingerprint set cache can be changed using the LRU or LFU algorithm.

$$f_1 = m, f_n = g(f_{n-1}, p, \alpha, \beta) \qquad (1)$$

Equation 1 determines the number of fingerprints to send from the receiving portable terminal to the sending portable terminal.

In Equation 1, $f_n$ denotes the number of the fingerprints sent at an n-th time. m denotes an initial value of the number of the fingerprints initially transmitted. The function g( ) has parameters including the number of fingerprints $f_{n-1}$ previously sent, an increase variable $\alpha$, a decrease variable $\beta$, and a ratio p of the previous fingerprints and the used fingerprints.

When the ratio p is greater than or equal to a threshold, the number of the next fingerprints $f_n$ increases. When the ratio p is smaller than the threshold by w, the number of the next fingerprints $f_n$ decreases.

$$f_n = f_{n-1} + \alpha p \qquad (2)$$
$$f_n = f_{n-1} - \beta p$$

$$f_n = f_{n-1} \times \alpha p \qquad (3)$$
$$f_n = f_{n-1} \times \frac{p}{\beta}$$

The function g( ) can be expressed as Equation 2 and Equation 3. That is, the function g( ) can use Additive Increase Additive Decrease (AIAD) of Equation 2, Multiplicative Increase Multiplicative Decrease (MIMD) of Equation 3, or a combination of them with the increase variable $\alpha$ and the decrease variable $\beta$.

Figure 4A:
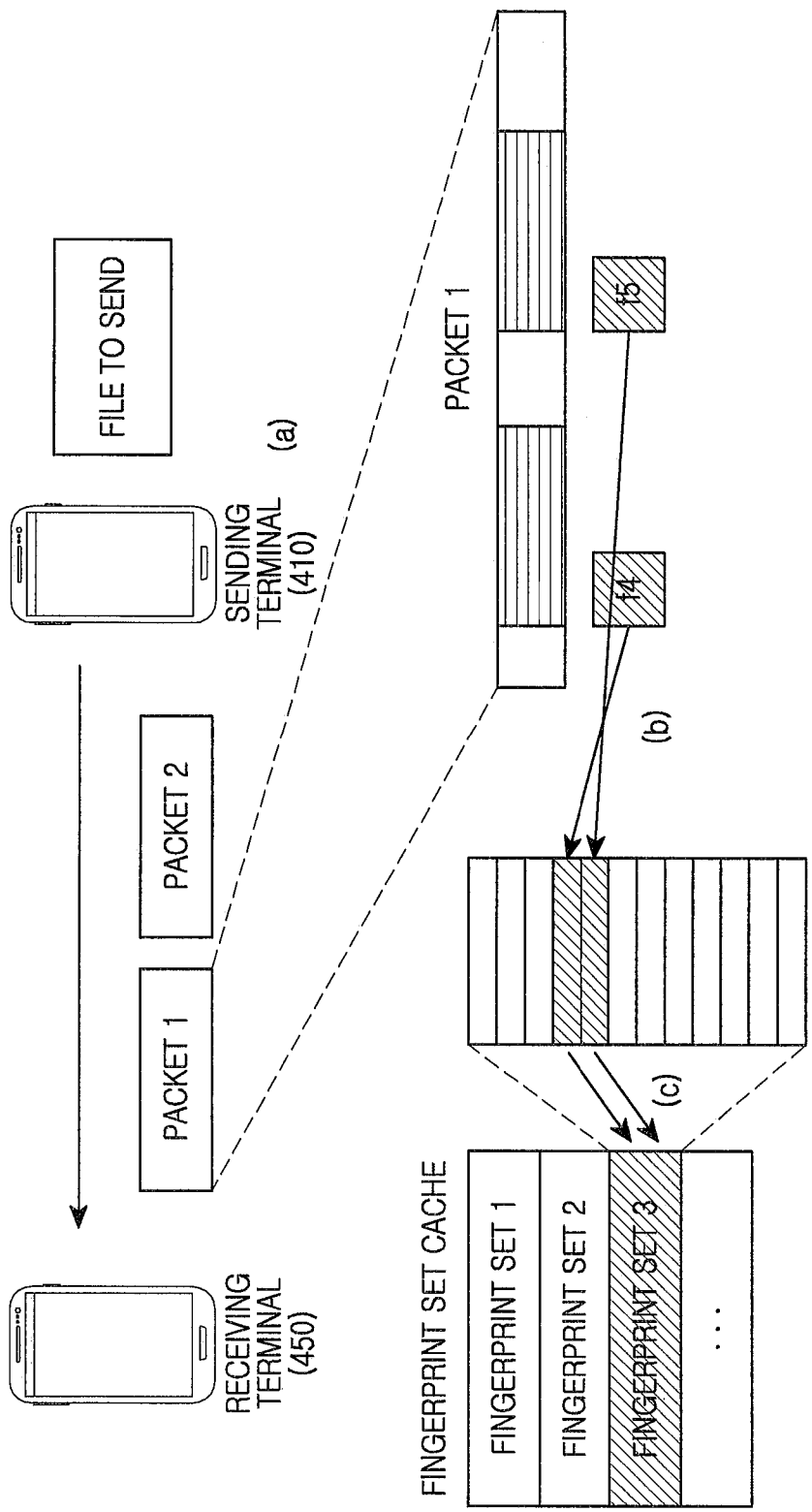
FIGS. 4A and 4B illustrate operations of a portable terminal according to an embodiment of the present disclosure.
Figure 4B:
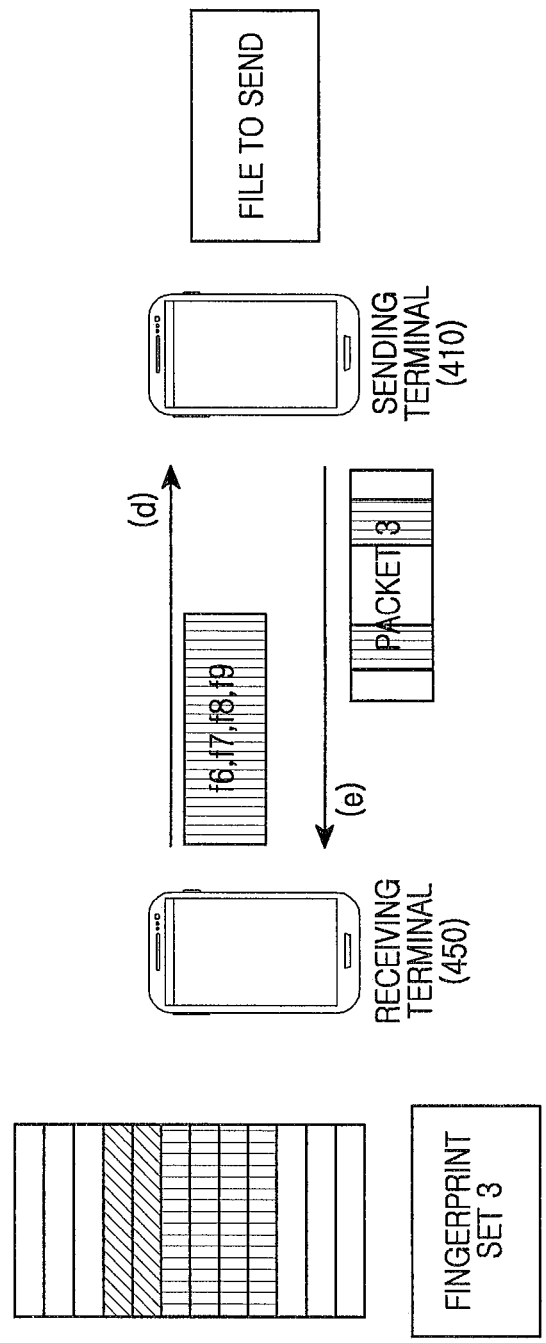

FIGS. 4A and 4B depict operations of the portable terminal according to an embodiment of the present disclosure.

Referring to FIGS. 4A and 4B, a sending portable terminal 410 sends an unencoded packet to a receiving portable terminal 450 in step (a).

Next, the receiving portable terminal 450 fetches the redundant chunk of the chunks of the received packet from the fingerprint set cache in steps (b) and (c).

For example, as shown in FIG. 4, the receiving portable terminal 450 receives the packet, obtains the fingerprints of the chunks of the packet, obtains the redundant fingerprints f4 and f5 of the obtained fingerprints from at least one fingerprint set of the fingerprint set cache, and acquires a fingerprint set 3 including f4 and f5.

Next, the receiving portable terminal 450 fetches the fingerprint corresponding to the chunk expected to be received next, from the fingerprint set cache, and sends the fetched fingerprint to the sending portable terminal 410 in step (d).

The sending portable terminal 410 encodes and sends the next packet using the received fingerprints in step (e). In the encoding process, when the fingerprints of the chunks of the sent packet and the received fingerprints include the redundant fingerprint, the sending portable terminal 410 replaces the redundant chunk with the fingerprint.

Next, the receiving portable terminal 450 repeatedly determines the number of fingerprints to send next by comparing the number of fingerprints sent by itself with the number of the actual fingerprints, and sends new fingerprints corresponding to the determined number, to the sending portable terminal 410.

For example, the receiving portable terminal 450 can obtain the fingerprints expected to be received next from the fingerprint set 3 of the fingerprint set cache. The fingerprints fetched by the receiving portable terminal 450 can include f6, f7, f8, and f9. The receiving portable terminal 450 can obtain the expected fingerprints on the time basis.

Figure 5:
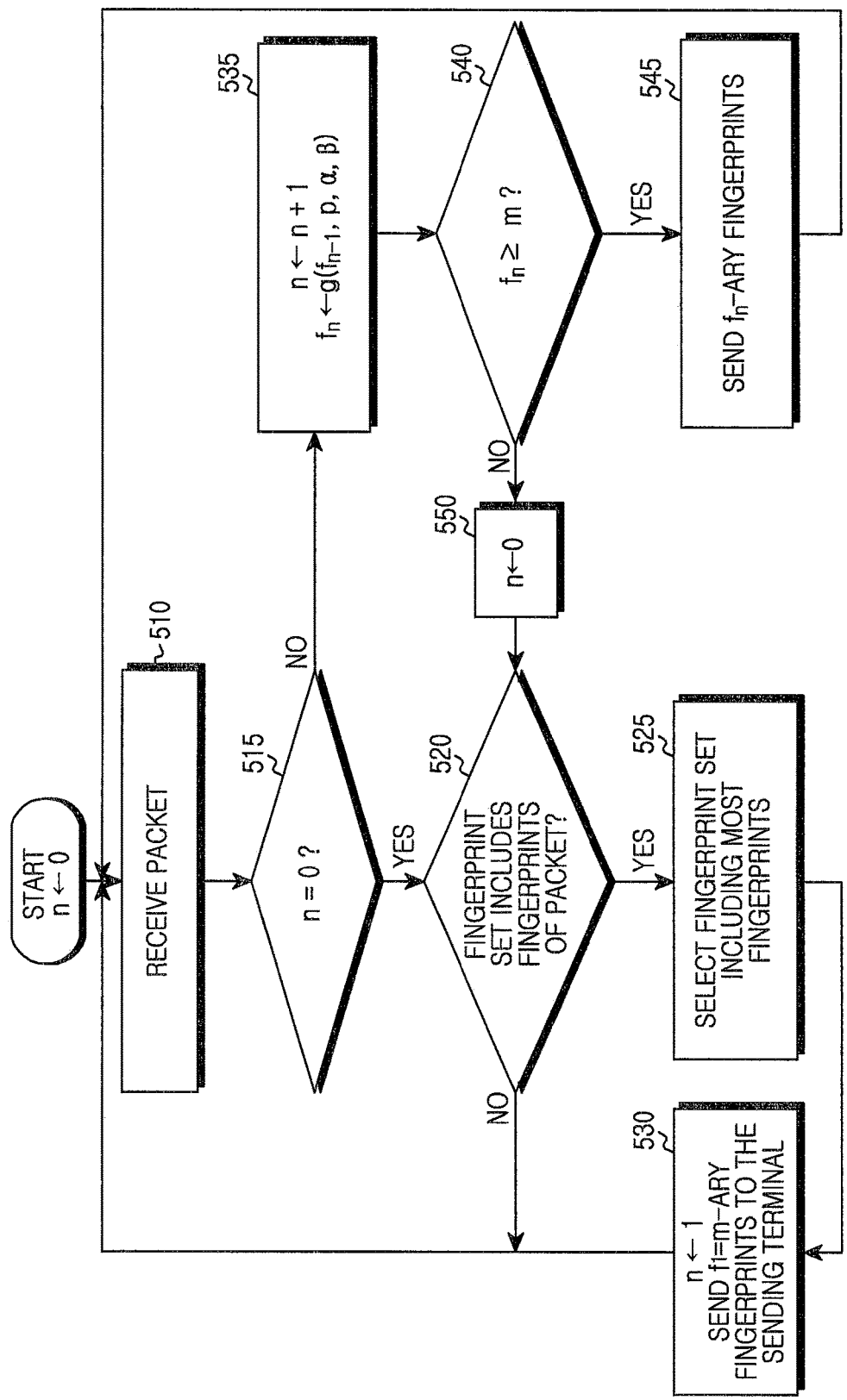
FIG. 5 illustrates a method of a receiving portable terminal for determining the number of fingerprints to send to a sending portable terminal according to an embodiment of the present disclosure.

FIG. 5 is a flowchart of a method of the receiving portable terminal for determining the number of fingerprints to send to the sending portable terminal according to an embodiment of the present disclosure.

Referring to FIG. 5, the receiving portable terminal sets the value n to zero in order to newly start the fingerprint transmission algorithm.

When receiving the packet in step 510, the receiving portable terminal determines whether n=0 in step 515. That is, the receiving portable terminal determines whether to newly start the fingerprint transmission algorithm. Since the current stage is the initial stage, n=0 so that the receiving portable terminal newly starts the fingerprint transmission algorithm.

In step 520, the receiving portable terminal determines whether there is the fingerprint set including the fingerprint of the received packet. That is, the receiving portable terminal determines whether its fingerprint set cache stores the fingerprint corresponding to the chunk of the received packet. Upon detecting the fingerprint set, the receiving portable terminal selects the fingerprint set including the most fingerprints in step 525. That is, among the plurality of the fingerprint sets, the receiving portable terminal selects the fingerprint set including the most fingerprints.

In step 530, the receiving portable terminal sets n=1 and sends m-ary fingerprints matching in the selected fingerprint set, to the sending portable terminal. That is, the receiving portable terminal sends the fingerprints to the sending portable terminal and continues the packet reception in step 510.

When no fingerprint sets store the fingerprints of the receive packet in step 520, the receiving portable terminal continues the packet reception.

Upon receiving the packet in step 510, the receiving portable terminal determines whether n=0 in step 515. That is, when n=1, that is, when there is no need to newly start the fingerprint transmission algorithm, the receiving portable terminal increases n by 1 and determines the number of fingerprints to send in step 535.

The receiving portable terminal can determine the number of the fingerprints to send based on Equation 1, Equation 2, and Equation 3. That is, the receiving portable terminal can determine the number of the fingerprints to send next based on the function g( ).

To determine the number of the fingerprints, the receiving portable terminal can apply the AIAD based on Equation 2 and the MIMD based on Equation 3.

When the determined number of the fingerprints $f_n$ is greater than or equal to m in step 540, the receiving portable terminal selects and sends the $f_n$-ary fingerprints of the fingerprint set to the sending portable terminal in step 545 and continues the packet reception in step 510.

When the determined number of the fingerprints $f_n$ is smaller than m, the receiving portable terminal determines whether there is the fingerprint set including the fingerprint of the received packet in step 520 and repeats the next steps.

Figure 6:
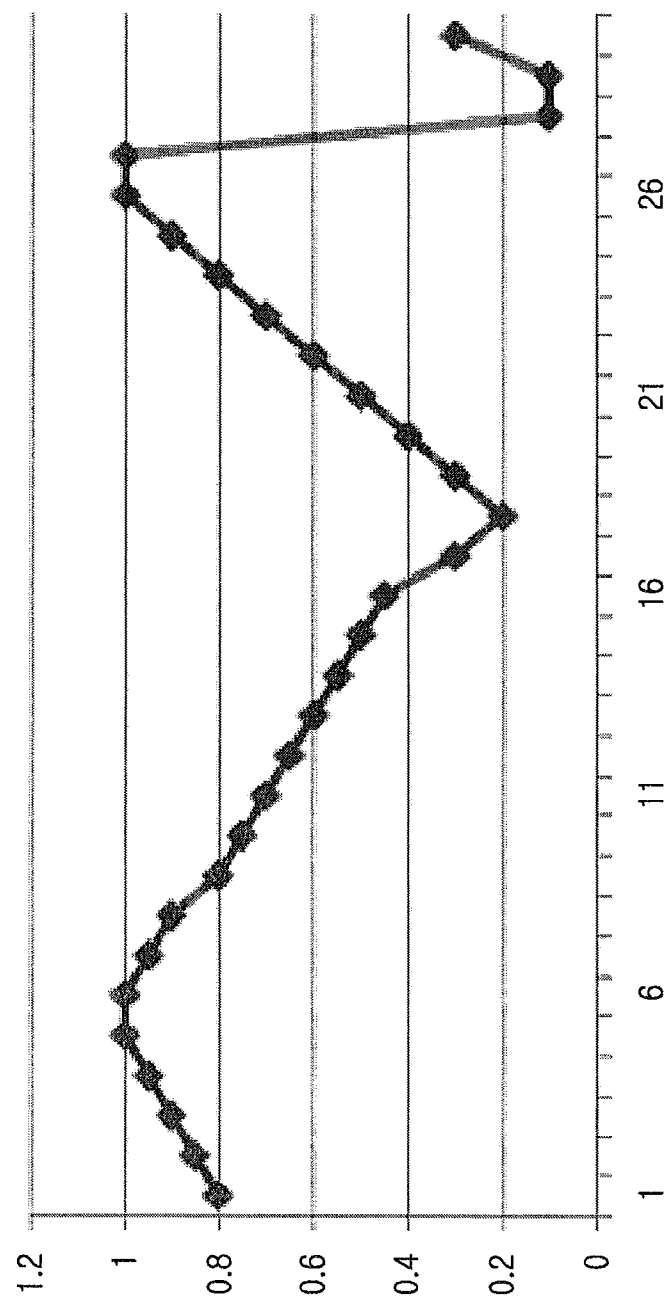
FIG. 6 illustrates a deduplication performance according to an embodiment of the present disclosure.

FIG. 6 depicts a deduplication performance according to an embodiment of the present disclosure.

Referring to FIG. 6, the number of the matching fingerprints/the number of the sent fingerprints is represented based on time, and 1 indicates the highest matching of the fingerprints. The number of the fingerprints/the number of the sent fingerprints ranges from 0.1 to 1.

Figure 7:
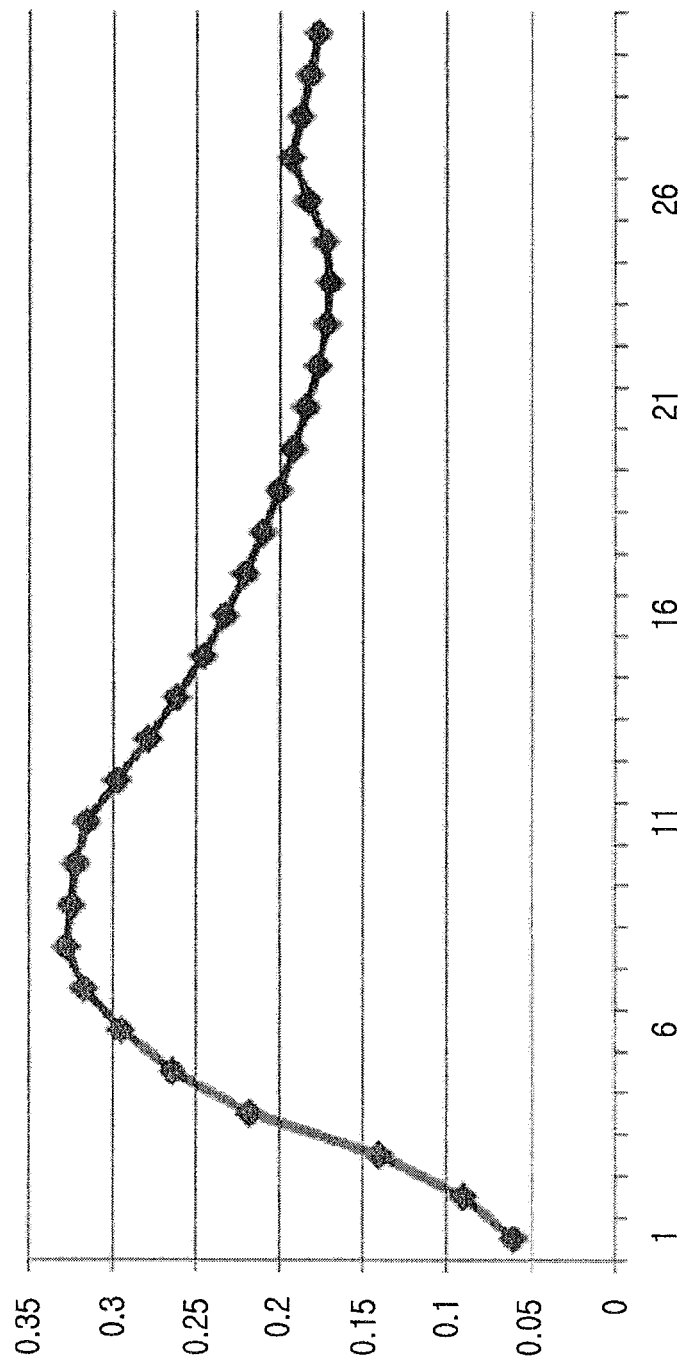
FIG. 7 illustrates the deduplication performance according to an embodiment of the present disclosure.

FIG. 7 depicts the deduplication performance according to an embodiment of the present disclosure.

Referring to FIG. 7, to demonstrate the reduction effect of the present deduplication, 1− the traffic (byte) using the present method/the traffic (byte) without the present method is represented based on time. In FIG. 7, zero in the vertical axis indicates no traffic reduction and 1 indicates the high traffic reduction.

In FIG. 7, it is assumed that thirty 1000-byte packets are transmitted, the size of the chunk to generate with the fingerprint is 70 bytes, and the fingerprint size compressed with the hash function is 20 bytes.

The algorithm for increasing or decreasing the number of the fingerprints to send adopts the MIMD algorithm, and assumes m=2, α=2, β=2, and threshold=0.7.

As shown in FIG. 7, as the probability of the vertical axis rises, the traffic reduction gradually increases. Even when the probability sharply drops, the traffic reduction does not fall suddenly. The reduction over 30% can be achieved at the highest gain based on the fingerprint compression ratio.

Figure 8:
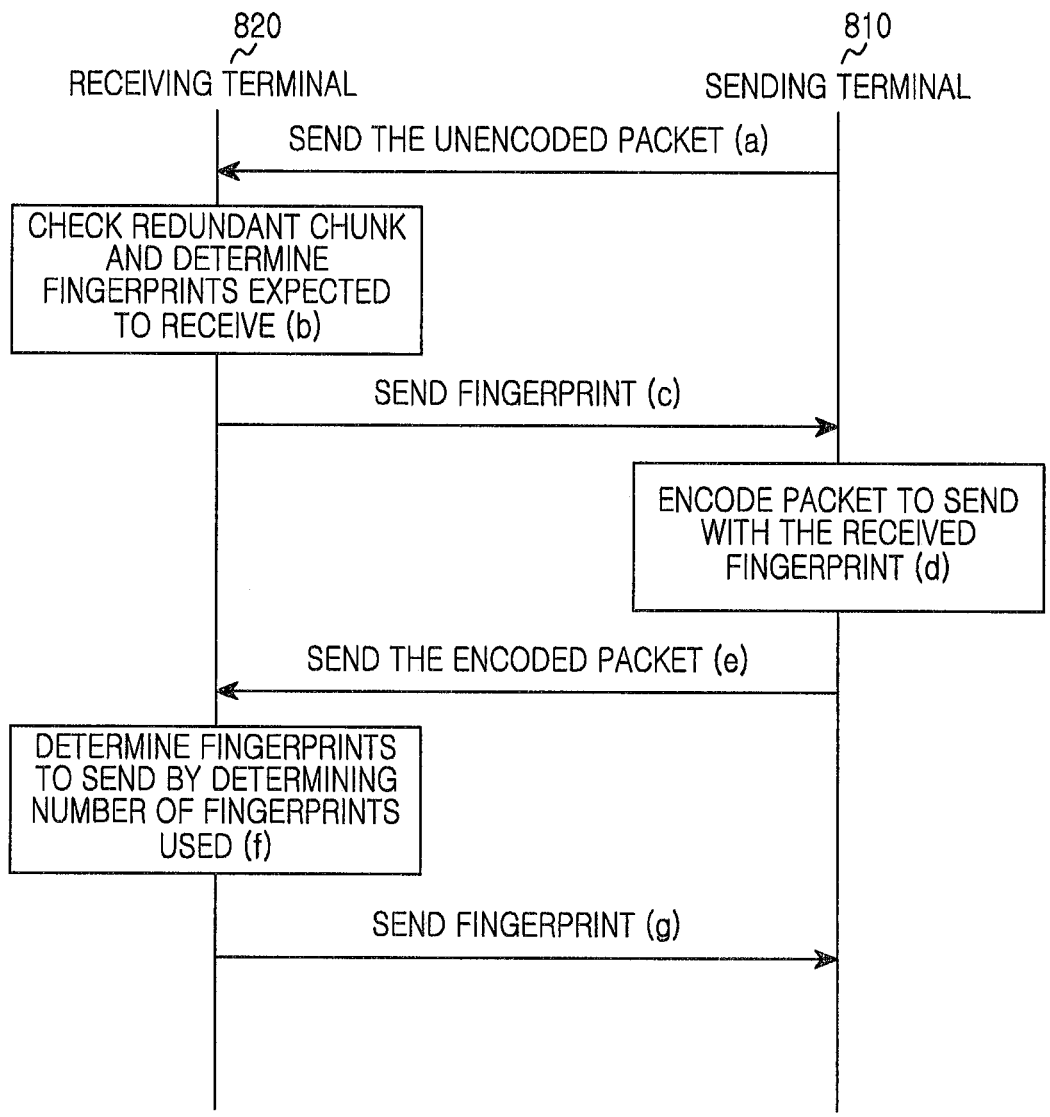
FIG. 8 illustrates operations between the sending portable terminal and the receiving portable terminal according to an embodiment of the present disclosure.

FIG. 8 depicts the operations between the sending portable terminal and the receiving portable terminal according to an embodiment of the present disclosure.

Referring to FIG. 8, the sending portable terminal 810 sends its file to the receiving portable terminal 820 on the packet basis in step (a). At this time, the packet is not encoded. Next, the receiving portable terminal 820 generates the fingerprints of the chunks in the received packet.

Next, the receiving portable terminal 820 fetches the fingerprint set overlapping the generated fingerprints from its fingerprint set cache. Since the receiving portable terminal 820 stores the chunks of the previous packet in the fingerprint set on the time basis, it is highly likely that it receives the next chunks of the last redundant chunk in the next packet.

The receiving portable terminal 820 selects the fingerprint set including the most fingerprints. That is, among the plurality of the fingerprint sets, the receiving portable terminal 820 selects the fingerprint set including the most fingerprints.

The receiving portable terminal 820 determines the number of the fingerprints expected to be received based on Equation 1, Equation 2, and Equation 3 in step (b) and sends the corresponding fingerprints to the sending portable terminal 810 in step (c).

The sending portable terminal 810 encodes the packet to send with the received fingerprints in step (d) and sends the packet to the receiving portable terminal 820 in step (e). When the fingerprints of the chunks of the sent packet and the received fingerprints include the redundant fingerprint in the process of the packet encoding, the sending portable terminal 810 replaces the redundant chunk with the fingerprint.

Next, the receiving portable terminal 820 receives the encoded packet and fetches the redundant fingerprint set of the generated fingerprint from its fingerprint set cache.

The receiving portable terminal 820 selects the fingerprint set including the most fingerprints. That is, among the plurality of the fingerprint sets, the receiving portable terminal 820 selects the fingerprint set including the most fingerprints.

The receiving portable terminal 820 determines the number of the fingerprints expected to be received based on Equation 1, Equation 2, and Equation 3 in step (f) and sends the corresponding fingerprints to the sending portable terminal 810 in step (g).

Figure 9:
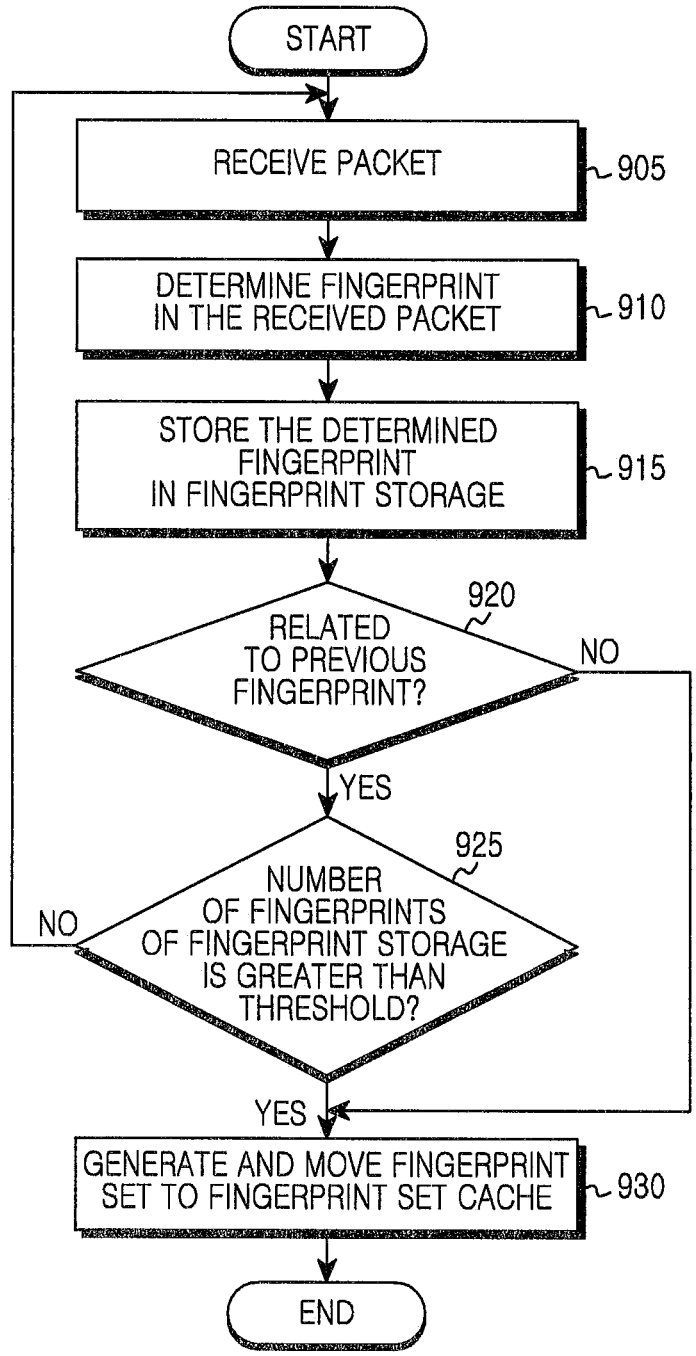
FIG. 9 illustrates a method for replacing the fingerprint set cache of the portable terminal according to an embodiment of the present disclosure.

FIG. 9 is a flowchart of a method for replacing the fingerprint set cache of the portable terminal according to an embodiment of the present disclosure.

Referring to FIG. 9, after the booting up, when receiving the packet in step 905, the portable terminal determines the fingerprint in the received packet in step 910 and stores the determined fingerprint in the fingerprint storage in step 915.

When the stored fingerprint is related to the previous fingerprint in step 920 and the number of the fingerprints of the fingerprint storage exceeds the threshold in step 925, the portable terminal generates one fingerprint set and moves the generated fingerprint set to the fingerprint set cache in step 930.

When the stored fingerprint is not related to the previous fingerprint in step 920, the portable terminal generates one fingerprint set and moves the generated fingerprint set to the fingerprint set cache in step 930.

The corresponding fingerprint set in the fingerprint set cache can be newly prioritized based on the LRU or LFU algorithm.

The fingerprints selected from the corresponding fingerprint set and sent to the sending portable terminal are stored in their fingerprint storage. The fingerprint storage stores the fingerprints duplicated from the fingerprint set and the fingerprints newly extracted from the received packet on the time basis. When the stored fingerprints exceed the threshold, the corresponding fingerprints are generated as a new fingerprint set and moved to the fingerprint set cache.

Figure 10:
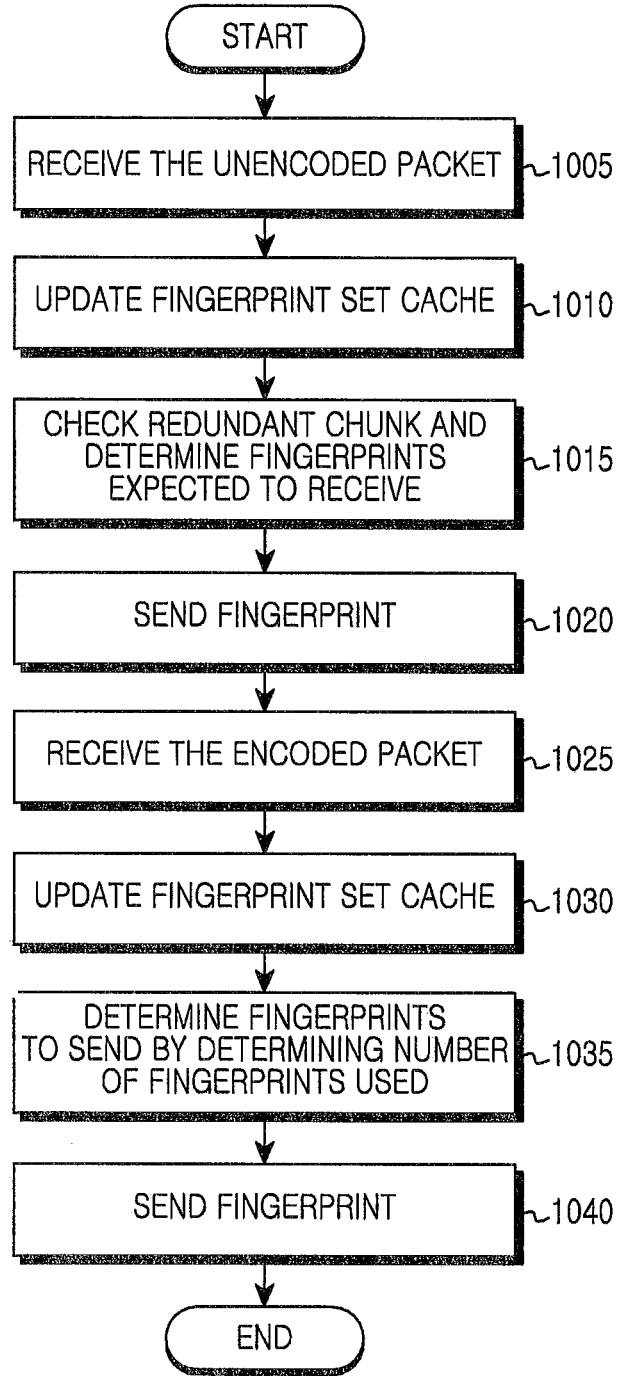
FIG. 10 illustrates operations of the receiving portable terminal according to an embodiment of the present disclosure.

FIG. 10 illustrates operations of the receiving portable terminal according to an embodiment of the present disclosure.

Referring to FIG. 10, the receiving portable terminal receives the unencoded packet in step 1005 and updates the fingerprint set cache by generating the fingerprints of the chunks of the received packet in step 1010. The update process has been explained in FIG. 9.

Next, the receiving portable terminal retrieves the fingerprint set overlapping the generated fingerprints from its fingerprint set cache. Since the receiving portable terminal stores the chunks of the previous packet in the fingerprint set on the time basis, it is highly likely that it receives the next chunks of the last redundant chunk in the next packet. The receiving portable terminal selects the fingerprint set including the most fingerprints. That is, among the plurality of the fingerprint sets, the receiving portable terminal selects the fingerprint set including the most fingerprints. Next, the receiving portable terminal determines the number of the fingerprints expected to be received based on Equation 1, Equation 2, and Equation 3 in step 1015 and sends the corresponding fingerprints to the sending portable terminal in step 1020.

Next, the receiving portable terminal receives the encoded packet in step 1025 and updates the fingerprint set cache by generating the fingerprints of the chunks of the received packet in step 1030. The update process has been explained in FIG. 9.

Next, the receiving portable terminal retrieves the fingerprint set overlapping the generated fingerprints from its fingerprint set cache, and selects the fingerprint set including the most fingerprints. That is, among the plurality of the fingerprint sets, the receiving portable terminal selects the fingerprint set including the most fingerprints. Next, the receiving portable terminal determines the number of the fingerprints expected to be received based on Equation 1, Equation 2, and Equation 3 in step 1035 and sends the corresponding fingerprints to the sending portable terminal in step 1040.

Figure 11:
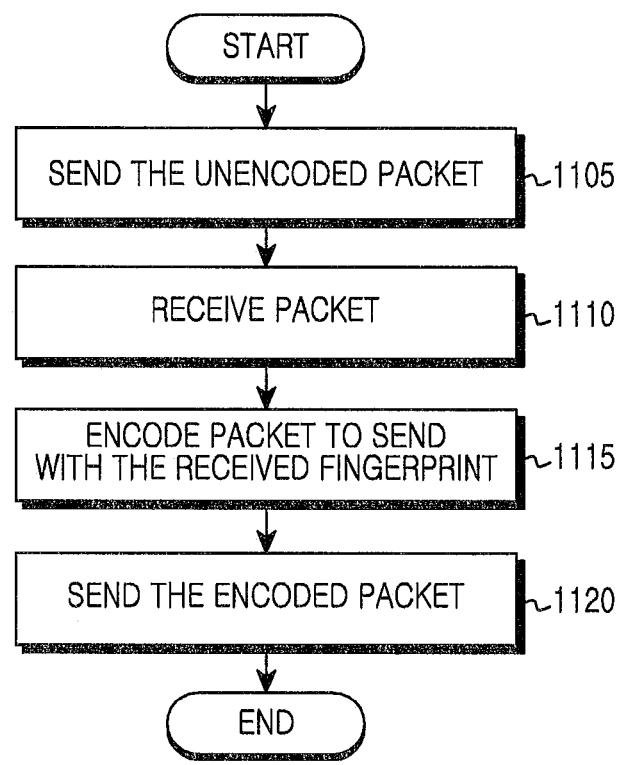
FIG. 11 illustrates operations of the sending portable terminal according to an embodiment of the present disclosure.

FIG. 11 illustrates operations of the sending portable terminal according to an embodiment of the present disclosure.

Referring to FIG. 11, the sending portable terminal sends its file to the receiving portable terminal on the packet basis in step 1105. At this time, the packet is not encoded.

In step 1110, the sending portable terminal receives the fingerprints from the receiving portable terminal.

The sending portable terminal encodes the packet to send with the received fingerprints in step 1115 and sends the packet to the receiving portable terminal in step 1120.

When the fingerprints of the chunks of the packet to send and the received fingerprints include the redundant fingerprint in the process of the packet encoding, the sending portable terminal replaces the redundant chunk with the fingerprint.

Figure 12:
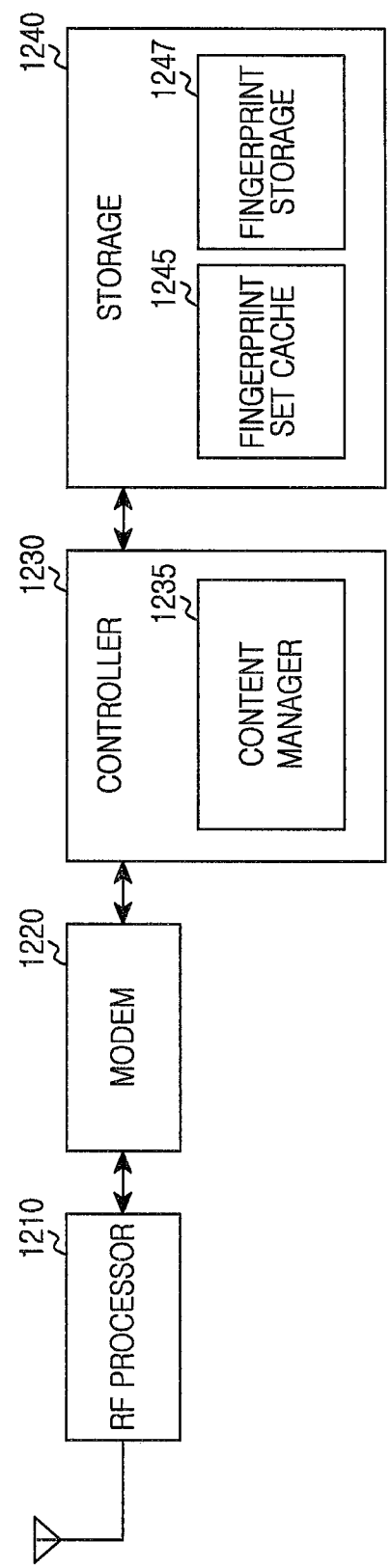
FIG. 12 illustrates the portable terminal according to an embodiment of the present disclosure.

FIG. 12 is a block diagram of the portable terminal according to an embodiment of the present disclosure.

Referring to FIG. 12, the portable terminal includes a Radio Frequency (RF) processor 1210, a modem 1220, a controller 1230, and a storage 1240. The RF processor 1210 and the modem 1220 can be referred to as a communication part.

The RF processor 1210 transmits and receives signals over a radio channel using signal band conversion and amplification. That is, the RF processor 1210 up-converts a baseband signal fed from the modem 1220 to an RF signal, transmits the RF signal over an antenna, and down-converts an RF signal received over the antenna to a baseband signal. For example, the RF processor 1210 can include an amplifier, a mixer, an oscillator, a Digital to Analog Converter (DAC), an Analog to Digital Converter (ADC), and so on. While the single antenna is depicted in FIG. 12, the base station can include a plurality of antennas.

The modem 1220 converts the baseband signal to a bit string and vice versa according to a physical layer standard of the system. For example, to transmit data according to Orthogonal Frequency Division Multiplexing (OFDM), the modem 1220 generates the complex symbols by encoding and modulating a transmit bit string, maps the complex symbols to the subcarriers, and generates the OFDM symbols using Inverse Fast Fourier Transform (IFFT) and Cyclic Prefix (CP) addition. When receiving data, the modem 1220 splits the baseband signal fed from the RF processor 1210 to the OFDM symbols, restores the signals mapped to the subcarriers using FFT, and restores the receive bit string by demodulating and decoding the signals. Particularly, the modem 1220 serves as a Media Access Control (MAC) layer of the base station or the terminal.

The controller 1230 controls the operations of the portable terminal. For example, the controller 1230 controls the signal transmission and reception through the modem 1220 and the RF processor 1210. The controller 1230 can include at least one processor.

The controller 1230 includes a content manager 1235. The content manager 1235 carries out the deduplication of the present disclosure.

The storage 1240 stores a program for controlling the operations of the portable terminal, and temporary data generating in the program execution. In particular, the storage 1240 includes a fingerprint set cache 1245 and a fingerprint storage 1247.

Now, the operations of the portable terminal being the receiving portable terminal are described.

Upon receiving the unencoded packet, the content manager 1235 updates the fingerprint set cache 1245 by generating the fingerprints of the chunks of the received packet. The update process has been explained in FIG. 9.

Next, the content manager 1235 retrieves the fingerprint set overlapping the generated fingerprints from its fingerprint set cache 1245. Since the content manager 1235 stores the chunks of the previous packet in the fingerprint set on the time basis, it is highly likely that it receives the next chunks of the last redundant chunk in the next packet. The content manager 1235 selects the fingerprint set including the most fingerprints. That is, among the plurality of the fingerprint sets, the content manager 1235 selects the fingerprint set including the most fingerprints. Next, the content manager 1235 determines the number of the fingerprints expected to be received based on Equation 1, Equation 2, and Equation 3 and sends the corresponding fingerprints to the sending portable terminal.

Next, upon receiving the encoded packet, the content manager 1235 updates the fingerprint set cache 1245 by generating the fingerprints of the chunks of the received packet. The update process has been explained in FIG. 9.

Next, the content manager 1235 retrieves the fingerprint set overlapping the generated fingerprints from its fingerprint set cache 1245, and selects the fingerprint set including the most fingerprints. That is, among the plurality of the fingerprint sets, the content manager 1235 selects the fingerprint set including the most fingerprints. Next, the content manager 1235 determines the number of the fingerprints expected to be received based on Equation 1, Equation 2, and Equation 3 and sends the corresponding fingerprints to the sending portable terminal.

Now, the operations of the portable terminal being the sending portable terminal are described.

The content manager 1235 sends its file to the receiving portable terminal on the packet basis. At this time, the packet is not encoded.

The content manager 1235 receives the fingerprints from the receiving portable terminal.

The content manager 1235 encodes the packet to send with the received fingerprints and sends the packet to the receiving portable terminal.

When the fingerprints of the chunks of the sent packet and the received fingerprints include the redundant fingerprint in the process of the packet encoding, the content manager 1235 replaces the redundant chunk with the fingerprint.

The present deduplication method encodes the existing packet to the smaller packet. The existing packet can be encoded and compressed to about ⅓ of the original packet using the hash function of the deduplication method.

Such a gain can be obtained all the time when the caches of the sending portable terminal and the receiving portable terminal are synchronized. As discussed earlier, it is difficult to synchronize the caches of the sending portable terminal and the receiving portable terminal in the mobile communication system where the portable terminal moves around.

Hence, the gain gradually increases using the gradual cache sharing method of the present disclosure.

The present deduplication method increases or decreases the number of the fingerprints to send based on the probability of the number of the sent fingerprints and the number of the redundant fingerprints.

That is, when the number of the sent fingerprints and the number of the redundant fingerprints are identical, the probability is 1. Accordingly, it is highly likely that the sending portable terminal stores the same fingerprint set. Naturally, the sending portable terminal can encode and send more packets.

By contrast, when the number of the redundant fingerprints in the sent fingerprints is small, the probability falls and the packets to encode and send also reduce. Hence, the portable terminal decreases the number of the fingerprints to send.

As such, the present deduplication method achieves high efficiency based on the probability.

The methods as described in the claims and/or the specification of embodiments of the present disclosure can be implemented using hardware, software, or a combination of them.

As for the software, a computer-readable storage medium including one or more programs (software modules) can be provided. One or more programs stored in the computer-readable storage medium can be configured for execution by one or more processors of an electronic device. One or more programs include instructions for controlling the electronic device to execute the methods according to the embodiments as described in the claims and/or the specification of the present disclosure.

Such a program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs can be stored to a memory combining part or all of those recording media. A plurality of memories can be equipped.

The programs can be stored in an attachable storage device accessible via a communication network such as Internet, Intranet, Local Area Network (LAN), Wide LAN (WLAN), or Storage Area Network (SAN), or a communication network by combining these networks. The storage device can access the present electronic device through an external port. A separate storage device can access the present electronic device over a communication network.

As set forth above, the portable terminal can efficiently send the information without having to send and receive the redundant information.

Since the present disclosure is used independently of the protocol, it does not need a particular application. With any application, the present disclosure can transparently provide the cache effect to the user.

While the disclosure has been shown and described with reference to certain embodiments thereof, it will be understood by those skilled in the art that various changes in form and details can be made therein without departing from the spirit and scope of the disclosure as defined by the appended claims and their equivalents.

What is claimed is:

1. A method for operating a first terminal in a mobile communication system, the method comprising:
   receiving, from a second terminal, a first portion of data;
   determining a fingerprint set from at least one fingerprint set, the fingerprint set comprising at least one first fingerprint indicating the first portion of the data;
   transmitting, to the second terminal, at least one second fingerprint among a plurality of fingerprints included in the fingerprint set;
   receiving, from the second terminal, a portion of the at least one second fingerprint,
   determining, a number based on a ratio of the portion of the at least one second fingerprint;
   transmitting, to the second terminal, fingerprints, wherein a number of the fingerprints is equal to the determined number; and
   receiving, from the second terminal, a portion of the fingerprints,
   wherein the at least one second fingerprint indicates a second portion of the data determined to be received after the first portion of the data, and wherein the portion of the fingerprints indicates a third portion of the data being received after the second portion of the data.

2. The method of claim 1, wherein the fingerprint set is determined based on a level of redundancy for the at least one first fingerprint from the fingerprint set.

3. The method of claim 1, wherein determining the number comprises, if the ratio of the portion of the at least one second fingerprint is greater than or equal to a threshold, determining the number being increased from a number of the transmitted at least one second fingerprint.

4. The method of claim 1, wherein determining the number comprises, if the ratio of the portion of the at least one second fingerprint is less than a threshold, determining the number being decreased from a number of the transmitted at least one second fingerprint.

5. The method of claim 1, wherein the at least one second fingerprint is stored after the at least one first fingerprint is stored in the fingerprint set.

6. An apparatus for operating a first terminal in a mobile communication system, the apparatus comprising:
   a storage configured to store at least one fingerprint set;
   at least one transceiver configured to communicate with a second terminal; and
   at least one processor operatively coupled to the at least one processor, wherein the at least one processor is configured to:
     receive, from the second terminal, a first portion of data;
     determine a fingerprint set from the at least one fingerprint set, the fingerprint set comprising at least one first fingerprint indicating the first portion of the data;
     transmit, to the second terminal, at least one second fingerprint among a plurality of fingerprints included in the fingerprint set;
     receive, from the second terminal, a portion of the at least one second fingerprint;
     determine a number based on a ratio of the portion of the at least one second fingerprint;
     transmit, to the second terminal, fingerprints, wherein a number of the fingerprints is equal to the determined number; and
     receive, from the second terminal, a portion of the fingerprints,
   wherein the at least one second fingerprint indicates a second portion of the data determined to be received after the first portion of the data, and
   wherein the portion of the fingerprints indicates a third portion of the data being received after the second portion of the data.

7. The apparatus of claim 6, wherein the fingerprint set is determined based on a level of redundancy for the at least one first fingerprint from the at least one fingerprint set.

8. The apparatus of claim 6, wherein the at least one processor is configured to, if the ratio of the portion of the at least one second fingerprint is greater than or equal to a threshold, determine the number being increased from a number of the transmitted at least one second fingerprint.

9. The apparatus of claim 6, wherein the at least one processor is configured to, if the ratio of the portion of the at least one second fingerprint is less than a threshold, determine the number being decreased from a number of the transmitted at least one second fingerprint.

10. The apparatus of claim 6, wherein the at least one second fingerprint is stored after the at least one first fingerprint is stored in the fingerprint set.

11. A method for operating a second terminal in a mobile communication system, the method comprising:
   transmitting, to a first terminal, a first portion of data;
   receiving, from the first terminal, at least one second fingerprint among a plurality of fingerprints included in a fingerprint set comprising at least one first fingerprint indicating the first portion of the data, wherein the fingerprint set is determined from at least one fingerprint set by the first terminal;
   generating a packet by encoding a part of the data by using the at least one second fingerprint; and
   transmitting, to the first terminal, the packet comprising a portion of the at least one second fingerprint;
   receiving, from the first terminal, fingerprints;
   generating at least one packet by encoding another part of the data by using the fingerprints; and
   transmitting, to the first terminal, the at least one packet comprising a portion of the fingerprints,
   wherein the at least one second fingerprint indicates a second portion of the data determined, by the first terminal, to be received after the first portion of the data, and
   wherein a number of the received fingerprints is determined based on a ratio of the portion of the at least one second fingerprint by the first terminal.

12. The method of claim 11, wherein generating the packet comprises:
   determining at least one third fingerprint indicating an overlapping part that corresponds to a part indicated by the at least one second fingerprint in the part of the data;
   replacing the overlapping part with the at least one third fingerprint; and
   generating the packet comprising the at least one third fingerprint.

13. The method of claim 12, further comprising storing the at least one third fingerprint in the fingerprint set based on time.

14. An apparatus for operating a second terminal in a mobile communication system, the apparatus comprising:
   a storage configured to store at least one fingerprint set;
   a communication part configured to communicate with a first terminal; and
   a controller operatively coupled to the communication part, wherein the controller is configured to:
     transmit, to the first terminal, a first portion of data;
     receive, from the first terminal, at least one second fingerprint among a plurality of fingerprints included in a fingerprint set comprising at least one first fingerprint indicating the first portion of the data, wherein the fingerprint set is determined from at least one fingerprint set by the first terminal;
     generate a packet by encoding a part of the data by using the at least one second fingerprint; and
     transmit, to the first terminal, the packet comprising a portion of the at least one second fingerprint;
   receive, from the first terminal, fingerprints;
   generate at least one packet by encoding another part of the data by using the fingerprints; and
   transmit, to the first terminal, the at least one packet comprising a portion of the fingerprints,
   wherein the at least one second fingerprint indicates a second portion of the data determined, by the first terminal, to be received after the first portion of the data, and
   wherein a number of the received fingerprints is determined based on a ratio of the portion of the at least one second fingerprint by the first terminal.

15. The apparatus of claim 14, wherein the controller is configured to:
- determine at least one third fingerprint indicating an overlapping part that corresponds to a part indicated by the at least one second fingerprint in the part of the data;
- replace the overlapping part with the at least one third fingerprint; and
- generate the packet comprising at least one third fingerprint.

16. The apparatus of claim 15, wherein the storage is configured to store the at least one third fingerprint in the fingerprint set based on time.

* * * * *